US012240253B2

(12) United States Patent
Gutgsell et al.

(10) Patent No.: US 12,240,253 B2
(45) Date of Patent: Mar. 4, 2025

(54) PRINTING SYSTEM COMPRISING AN ADJUSTMENT ACTUATOR FOR THE ADJUSTMENT OF A PLURALITY OF PRINT HEADS

(71) Applicants: Durst Group AG, Brixen (IT); Durst Austria GMBH, Lienz (AT)

(72) Inventors: Philipp Gutgsell, Schlanders-Goflan (IT); Simon Horngacher, Lienz (AT); Clemens Poernbacher, Sand in Taufers (IT); Manuel Wieland, Vahrn (IT); Eduard Brunner, Klausen (IT)

(73) Assignees: Durst Group AG, Brixen (IT); Durst Austria GMBH, Lienz (AT)

( * ) Notice: Subject to any disclaimer, the term of this patent is extended or adjusted under 35 U.S.C. 154(b) by 154 days.

(21) Appl. No.: 18/018,439

(22) PCT Filed: Jul. 13, 2021

(86) PCT No.: PCT/EP2021/025258

§ 371 (c)(1),
(2) Date: Jan. 27, 2023

(87) PCT Pub. No.: WO2022/028733

PCT Pub. Date: Feb. 10, 2022

(65) Prior Publication Data

US 2023/0294432 A1 Sep. 21, 2023

(30) Foreign Application Priority Data

Aug. 5, 2020 (IT) ........................ 102020000019255

(51) Int. Cl.
*B41J 25/00* (2006.01)

(52) U.S. Cl.
CPC .................................. *B41J 25/006* (2013.01)

(58) Field of Classification Search
CPC ........ B41J 25/006; B41J 25/003; B41J 25/34; B41J 25/304; B41J 25/308; B41J 25/3088;
(Continued)

(56) References Cited

U.S. PATENT DOCUMENTS

| | | | | |
|---|---|---|---|---|
| 2009/0244124 | A1 | 10/2009 | Kondo | |
| 2017/0259598 | A1* | 9/2017 | Mueller | B41J 2/2146 |
| 2019/0255867 | A1* | 8/2019 | Mueller | B41J 25/001 |

FOREIGN PATENT DOCUMENTS

| | | | |
|---|---|---|---|
| DE | 102011085917 | A1 | 5/2012 |
| DE | 102016209945 | A1 | 1/2017 |

(Continued)

OTHER PUBLICATIONS

International Search Report (ISR) for PCT/EP2021/025258 mailed Mar. 9, 2022 (8 pages).

*Primary Examiner* — Thinh H Nguyen
(74) *Attorney, Agent, or Firm* — Shumaker, Loop & Kendrick, LLP

(57) ABSTRACT

Printing system including at least a first and a second print head in which the printing system is configured in such a way that the first and second print heads can be adjusted actuator-based with respect to a printing medium by positioning and orienting using an adjustment actuator. The printing system includes at least one adjustment actuator less than the number of print heads provided in the printing system, and an auxiliary device is provided in the printing system such that with the aid thereof an operative connection of the at least one adjustment actuator with the first print head can be released and/or created, and an operative connection with the second print head can be created and/or released, preferably also actuator-based or in a pneumatic and actuator-based manner, and particularly preferably automatically.

12 Claims, 6 Drawing Sheets

(58) Field of Classification Search
CPC B41J 2025/008; B41J 2202/20; B41J 25/001; B41J 2202/21
See application file for complete search history.

(56) References Cited

FOREIGN PATENT DOCUMENTS

| | | | |
|---|---|---|---|
| DE | 102018219826 | A1 | 6/2019 |
| EP | 3530473 | A1 | 8/2019 |
| JP | 2004136555 | A | 5/2004 |

* cited by examiner

PRINTING SYSTEM COMPRISING AN ADJUSTMENT ACTUATOR FOR THE ADJUSTMENT OF A PLURALITY OF PRINT HEADS

TECHNICAL FIELD AND BACKGROUND

The present invention relates to a printing system comprising an adjustment actuator for adjusting a plurality of print heads.

Different printing systems with print heads can be used today to print various print media, such as paper materials or corrugated cardboard, with print material, with the print heads in the printing system being arranged either in a fixed or scannable manner with respect to the printing medium. In any case, the printing system must be configured when it is put into operation for the first time, wherein correct adjustment of the print heads with respect to the printing medium through orientation and positioning is of great importance. If only individual defective print heads need to be replaced in a system that has already been adjusted, it is usually necessary to only adjust the print heads that have recently been inserted in the printing system.

At this point, some of the terms used in this description should be defined in advance.

A printing system is a device by means of which a printing medium can be printed with print material according to a predetermined pattern.

When mentioning a print head in this description, this means a component with one or more nozzles arranged in one or more rows through which the print material can be delivered in a precisely positioned and directed manner in the direction of the printing medium. An arrangement of nozzles belongs to one and the same print head when it is provided in the application of the printing system that the arrangement can only be positioned and oriented in its entirety. "In the application" here means that the print head has been assembled and installed in the printing system.

An actuator is a general term for a component that converts electrical signals into mechanical movement or other physical variables. Actuators within the meaning of the present invention convert electrical signals into mechanical movement.

When mentioning an adjustment actuator in this description, it means an actuator by means of which a first object (here a print head) to which it is operatively connected can be moved mechanically with regard to positioning and orientation and with respect to a second object (here e.g. printing medium to be printed and/or adjacent print head).

Positioning means moving the first object into a target position with respect to the second object. Orientation is understood to mean a rotation of the first object into a target alignment with respect to the second object.

Since 2019 it has been known from DE 10 201 821 9826 A1 that the correct adjustment of print heads of a printing press can be achieved by using at least one motor-driven device for adjusting one print head per print head. The device for adjusting a print head which has been described therein comprises a stop and a shaft for displacing the stop, wherein the print head rests directly or indirectly against the stop, and wherein the stop and the shaft are connected to one another via a compensating coupling which compensates for axial path differences between the stop and the shaft, wherein the shaft is part of the motor or connected to it, wherein the motor is fixed to a frame.

Since 2012 a printing system with a pair of print bars, each with several print heads, has been well known from the older application DE 10 201 108 5917 A1 of the same generic type. In this printing system the print heads of the respective print bar are all connected operatively and directly, except for one which is connected indirectly, to an electric motor for adjusting a print head with respect to a direction running transversely to the printing direction.

However, the prior art printing systems mentioned above both have the disadvantage that the required motors make the construction of the printing system in the region around the print heads complicated and bulky on the one hand and very expensive on the other.

SUMMARY

There is therefore a need for a simple, less bulky and also cost-effective construction of a printing system in the region around the adjustable print heads.

It is therefore the object of the present invention to provide a printing system with a simple, less bulky and cost-effective construction in the region around the adjustable print heads.

According to the invention, the object is achieved with a printing system that comprises the characteristics of claim 1. The subclaims relate to other advantageous and, if necessary, additional inventive embodiments.

The object of the invention is achieved by providing a printing system having at least a first and a second print head, wherein the printing system is configured in such a way that the first and second print heads can be adjusted actuator-based with respect to a printing medium by positioning and orienting using the adjustment actuator.

According to the invention, the printing system comprises at least one adjustment actuator less than the number of print heads provided in the printing system, wherein an auxiliary device is provided in the printing system, in such a way that with the aid thereof an operative connection of the at least one adjustment actuator with the first print head can be released and/or created and an operative connection with the second print head can be created and/or released, preferably also in an actuator-based manner or in a pneumatic and actuator-based manner, and particularly preferably in an automated manner.

According to a preferred embodiment of the printing system according to the invention, optical means are provided in the printing system in such a way that automated adjustment of the print heads is enabled with said optical means, preferably using predetermined printed test patterns, said optical means being configured to cooperate with the auxiliary device.

This further development is advantageous because, on the one hand, the maintenance effort for the adjustment of the print heads can be minimized and on the other hand the corresponding adjustment can even be carried out by a layperson without expertise. The travel activity of service technicians required for the maintenance of such a printing system can thus be significantly reduced, leading to considerable savings potential for the end customer.

Since, up to now, it was only possible to adjust the print heads of a printing system manually, it took realistically, for example, a service technician several days up to about one week of man working hours to put a printing system with at least 200 print heads into operation for the first time. Printing systems with automatic adjustment of the print heads can significantly reduce the time required for adjustment and eliminate the susceptibility to errors of the adjusting process and therefore set a new standard in the printer industry.

Thanks to this further development, the inventors, for example, have succeeded in reducing the time required for adjusting a printing system of the type according to FIG. 1*a*, but with 4 modular colour units having 48 print heads each, from 4 to 8 hours per modular colour unit to about 10 minutes per modular colour unit.

The inventors have also succeeded in reducing the time required for adjusting a printing system of the type according to FIG. 2*a*, but with 200 print heads, from 16-32 hours to about 40 minutes.

According to a particularly preferred embodiment of the printing system according to the invention, the auxiliary device comprises at least one linear guide and one carriage, wherein the carriage is displaceably arranged on the linear guide and the at least one adjustment actuator is mounted on the carriage.

If the number of print heads is higher than the number of adjustment actuators, the auxiliary device can comprise less than five adjustment actuators, preferably only two adjustment actuators, particularly preferably only one adjustment actuator.

The printing system can be divided into an upper and a lower region, the lower region comprising a carrier onto which a receptacle is mounted having a receiving surface for receiving the printing medium, the upper region comprising at least one modular color unit arranged above the receiving surface and mounted on adjusting means which are adapted to be able to adjust the distance between the modular color unit and the receiving surface or the printing medium, wherein the modular color unit comprises at least one print bar including the first and the second print heads and wherein the receiving surface forms the boundary between the upper and the lower region.

According to a particularly preferred embodiment of a first variant of the printing system according to the invention, the auxiliary device is arranged in the upper region of the printing system, wherein it is preferably mounted on the at least one print bar, and it is particularly preferably mounted above and on the at least one print bar.

According to a particularly preferred embodiment of a second variant of the printing system according to the invention, the auxiliary device is arranged in the lower region of the printing system, wherein it is preferably mounted directly or indirectly on the carrier below the receiving surface.

The printing system can be an inkjet printing system.

BRIEF DESCRIPTION OF THE DRAWINGS

The invention is now explained below by way of example and with reference to the figures.

DETAILED DESCRIPTION

First, for the sake of clarity, the adjustment of a print head as such, realized by orientation with respect to a printing medium and depending on the shape of the same, will be discussed in general and specifically with reference to the preferred printing systems shown in FIGS. 1*a*-1*b* and FIG. 2*a* before the adjustment is then explained in its entirety in connection with the invention.

As already stated in the introduction, orientation is understood to mean a rotation of a first object into a target alignment with respect to a second object.

Alignment of a print head is generally understood to mean the angular alignment of a row of nozzles of the print head relative to a printing direction. Printing direction is understood to mean the direction of a linear relative movement between a printing medium and the row of nozzles of the print head during printing of the printing medium when the printing medium has a flat form, such as printing medium 203 in FIG. 2*a*.

Figure 1A:
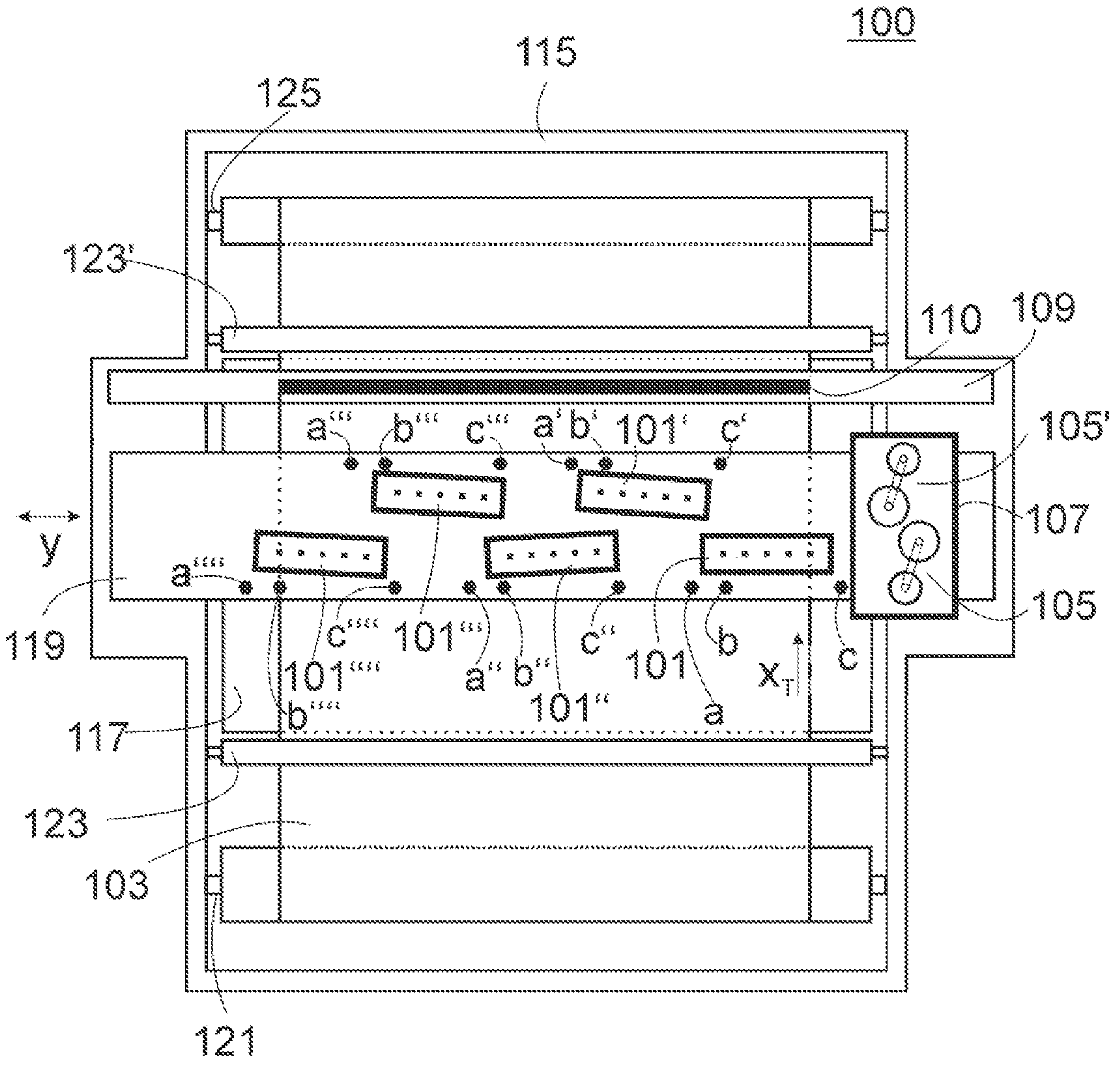
FIG. 1*a* shows a schematic top view of a particularly preferred embodiment of a first variant of the printing system according to the invention with an auxiliary device.
Figure 1B:
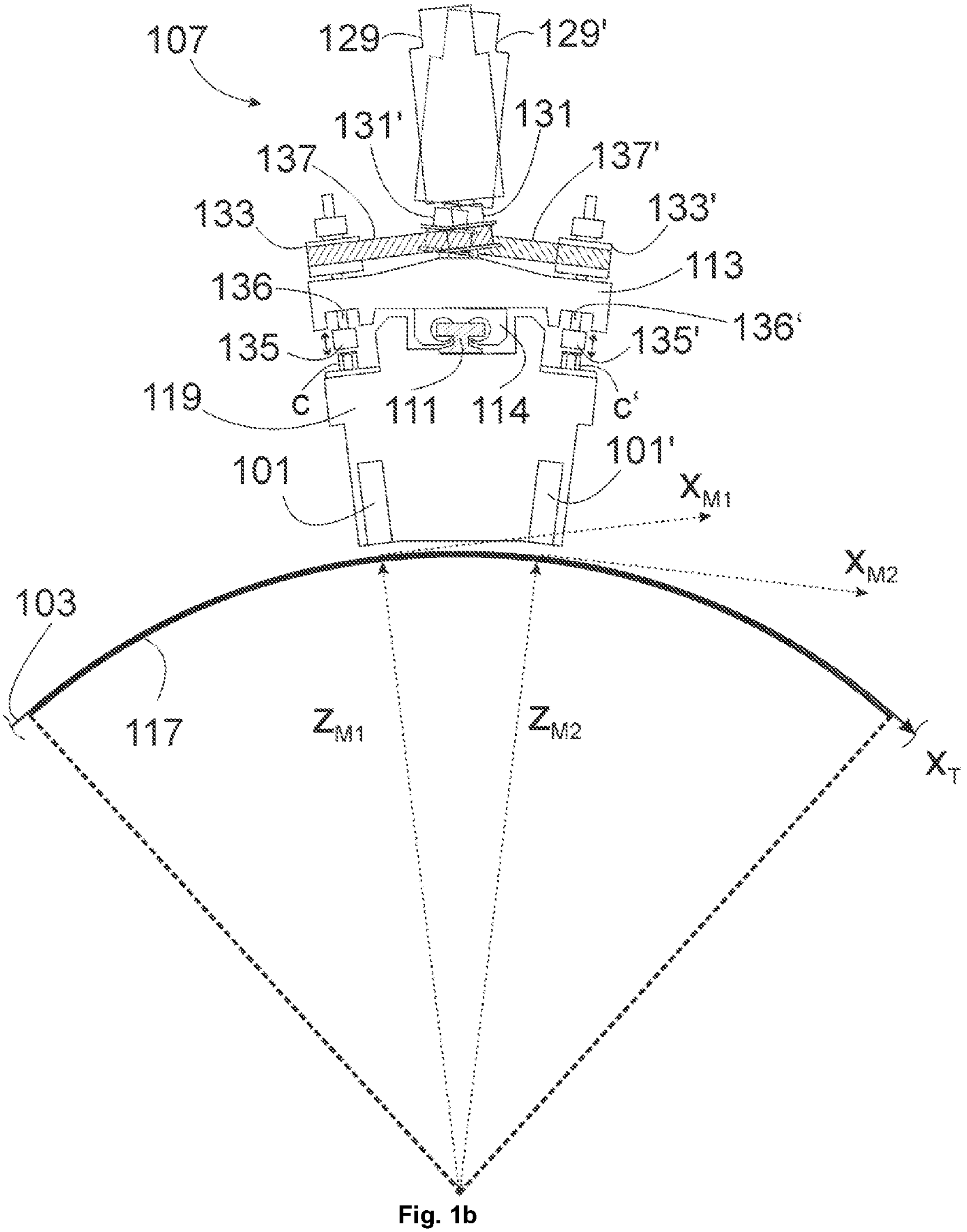
FIG. 1*b* shows a schematic front view of the second section of the printing system from FIG. 1*a* in cross section.

On the other hand, when printing on a bent printing medium having a cylindrical shape, such as printing medium 103 in FIG. 1*b*, the alignment of a print head is understood to mean the angular alignment of a row of nozzles of a print head relative to an instantaneous printing direction associated with it. An instantaneous printing direction associated with a row of nozzles of a print head is defined, in the sense of the present invention, as the direction of the instantaneous speed of the circular relative movement between the printing medium and the row of nozzles of the print head at the center of the operating area of the row of nozzles on the printing medium. The circular relative movement can be, for example, a circular transport movement of the printing medium over a print roller with a cylindrical roll shell for receiving the printing medium, as is the case, for example, in the printing system 200 in FIG. 1*b*. If a row of nozzles of a print head deviates in such a printing system from the target alignment with respect to the bent printing medium, which target alignment is parallel to the axis of rotation of the print roller, then each nozzle of a row of nozzles is associated with a different instantaneous printing direction. Therefore, when determining the instantaneous printing direction associated with the row of nozzles, the center of its operating area on the printing medium is used.

In such a printing system having two print heads, each with one row of nozzles which are arranged at different positions relative to the cylindrical roll shell, the rows of nozzles of the first and second print heads each have different instantaneous printing directions associated with them. If, for example, the printing medium 103 is conveyed in a uniform circular movement over the cylindrical roll shell 117 in FIG. 1*b*, the direction of the instantaneous speed of the printing medium 103 associated with the row of nozzles of the print head 101 is tangentially to the trajectory at the center of the operating area of its row of nozzles on the cylindrical roll shell 117, which corresponds to the $x_{M1}$ direction and is designated by $x_{M1}$ in FIG. 1*b*. The instantaneous printing direction associated with the row of nozzles of the print head 101', on the other hand, corresponds to the $x_{M2}$ direction, which is designated by $x_{M2}$ in FIG. 1*b*.

In a printing system having two print heads, each having one row of nozzles, which are arranged at different positions relative to a flat receiving surface of the printing system, the rows of nozzles of the first and second print heads, however, have one and the same (instantaneous) printing direction (associated with it).

In the printing system 100 in FIGS. 1*a*-1*b*, the transport movement of the printing medium 103 is referred to as $x_T$ movement and, as described above, the instantaneous direction of the transport movement of the printing medium 103 which is associated with the row of nozzles of the print head 101 is referred to as $x_{M1}$-direction and the instantaneous direction of the transport movement of the printing medium 103 which is associated with the row of nozzles of the print head 101' is referred to as $x_{M2}$ direction. The direction which is defined by the normal passing through the center point of the operating area of the row of nozzles of the print head 101 on the printing medium 103 is referred to as the $z_{M1}$-direction in the following. The direction which in turn is defined by the normal passing through the center point of the operating area of the row of nozzles of the print head 101' on the printing medium 103, is hereinafter referred to as the $z_{M2}$-direction.

As a rule, in the printing system 100, the instantaneous angular alignment of the normal of the front side of the printing medium 103, i.e. the side of the printing medium 103 that is printed with the print material, relative to the cylindrical roll shell 117 (hereinafter generally referred to as the $z_M$-orientation) is automatically given and thus correct. The same applies to the position in the $z_M$-direction. For the purposes of the present description, the origin of a right-hand Cartesian coordinate system is to be defined on this cylindrical roll shell, wherein the x-axis generally points in the $x_M$ direction, the y-axis in the y direction and the $z_M$-axis in the $z_M$-direction. A z-direction is always parallel to the axis of a radius of the print roll. That direction which is orthogonal to both the $x_M$-direction and the $z_M$-direction and through which a right-handed system is defined as the ordinate—with the $x_M$-direction as the abscissa—is referred to as the y-direction in the following. In the case of a cylindrical receiving surface as shown in FIG. 1*b*, the y-direction corresponds to the axis of rotation of the print roll and is identical for each print head.

In addition, as a rule, the angular alignment of the axis of rotation, around which the print head is to be rotated by means of suitable adjusting means to achieve a target alignment, relative to a $z_M$-direction associated with it, is automatically given in that it is essentially correct. The same applies to its position in the $z_M$-direction with respect to the printing medium.

If there is a deviation in the y-$z_M$-alignment of the row of nozzles of a print head with respect to the printing medium, a correction does not have to be made by rolling the print head around the $x_Z$-axis, but can be done by moving the print head in a y-direction.

If, however, there is a deviation in the $x_M$-$z_M$ alignment of the row of nozzles of a print head with respect to the printing medium, the correction does not have to be corrected by pitching the print head around the y-axis, but can be compensated for by changing the timing of the drop ejection.

The alignment of the rows of nozzles of two print heads in the $x_M$-y plane associated with each of them (hereinafter referred to as $x_M$-y alignment) is only correct if they both have one and the same angular alignment with respect to the $x_M$-direction associated with each of them in the center of the row of nozzles. Nevertheless, the instantaneous y-position of the row of nozzles of a print head in the y-direction is only correct, if the distance between two end nozzles of two directly adjacent rows of nozzles-which distance is transverse to the printing direction—is the same as the distance between two nozzles of a row of nozzles of one and the same print head.

Before putting the printing system into operation for the first time and usually after each replacement of the print head the $x_M$-y alignment and the y-position of the respective print heads must be checked and corrected, if necessary.

The correct $x_M$-y alignment of a respective print head is of great importance insofar as a constant print resolution transverse to the printing direction can be ensured with a respective print head of a plurality of print heads.

The correct y-position of a respective print head of a plurality of print heads with respect to an adjacent print head (typically not the same print head row), however, is of great importance insofar as the plurality of print heads of a modular color unit together can ensure an effective row length of the modular color unit without gaps or overlaps.

In order to achieve a correct y-position of a plurality of print heads, the respective print heads with rows of nozzles are usually placed one next to the other in two or more rows of print heads due to their structural characteristics, the axes of said rows of print head being aligned transversely to the printing direction and offset in the printing direction. A sequence of print heads in two rows is shown, for example, in FIG. 1*a*, in which a modular color unit comprises a print bar.

The invention will now be explained in its entirety with reference to the figures.

FIG. 1*a* shows a particularly preferred embodiment of the first variant of the printing system 100 according to the invention, comprising three sections.

The first section comprises a device for unwinding a printing medium 103 with a first winding core 121, a dancer roller (not shown) and a deflection roller 123, via which the printing medium 103 can be conveyed to a print roller with a cylindrical roll shell 117 as the receiving surface for receiving the printing medium 103. FIG. 1*b* shows a partial area of the print roller as dashed lines which are connected to the cylindrical roll shell 117.

The second section comprises the print roller with the cylindrical roll shell 117 for receiving the printing medium 103, wherein a modular color unit is assigned to said roll shell 117 for printing the printing medium 103, wherein the modular color unit has a print bar 119 with five print heads 101, 101', 101'', 101''', 101'''' which is opposite the roll shell 117 and spaced apart from it. The printing medium 103 picked up can be moved along a circular path via the cylindrical roll shell 117, while the printing medium 103 having the rows of nozzles (each shown as a broken line in the respective print head) of the print heads 100, 101', 101'', 101''', 101'''' can be printed.

In the printing system 100, the modular color unit is a single print bar 119.

A first and a second device for adjustment (not shown) are assigned to each of the five print heads 101, 101', 101'', 101''', 101''''. Via these devices for adjustment the respective print heads 101, 101', 101'', 101''', 101'''' can be adjusted with respect to the printing medium 103 by positioning and orienting by means of the first adjustment actuator 105 and by means of the second adjustment actuator 105'.

Accordingly, this preferred embodiment generally discloses a printing system 100 having at least a first and a second print head 101, 101'', wherein the printing system 100 is configured such that the first and second print heads 101, 101'' can be adjusted in an actuator-based manner with respect to a printing medium 103 by positioning and orienting using the adjustment actuator 105.

As the last and third section, the printing system 100 comprises a deflection roller 123', via which the printing medium 103 can be conveyed to the device for winding the printing medium 103 onto a second winding core 125. The device for unwinding the printing medium 103 with the first winding core 121, the print roller with cylindrical roll shell 117, the device for winding the printing medium 103 with the second winding core 125, the dancer roller and the two deflection rollers 123, 123' are each mounted rotatably on a carrier 115 of the printing system 100. The modular color unit comprising the print bar 119 is mounted via a bracket 144 on adjusting means 145 (see FIG. 1*c*) which are configured to be able to set the distance between the modular color unit and the cylindrical roll shell 117 or the printing medium 103, wherein the adjusting means 145 are mounted on the carrier 115 (not shown).

The first device for adjusting a print head, which is assigned to each of the five print heads 101, 101', 101", 101'", 101"", comprises an orientation device (not shown) and a first shaft a, a', a", a'", a"". The second device for adjusting a print head which is assigned to each of the five print heads 101, 101', 101", 101'", 101"" comprises a displacement device (not shown) and a second shaft c, c', c", c'", c"".

The first shaft a' is operatively connected to the orientation device via which the print head 101' is arranged in the print bar 119, and the second shaft c' is operatively connected to the displacement device via which the print head 101' is arranged in the print bar 119. The other first shafts a, a", a'", a"" and second shafts c, c", c'", c"" are operatively connected to the other orientation and displacement devices of the corresponding print heads 101, 101", 101'", 101"". The first shafts a, a', a", a'", a"" and second shafts c, c", c'", c"" are mechanical auxiliary means.

Each displacement device and the first shaft assigned to it are cooperatively configured such that a rotation of the first shaft is converted into a displacement of a corresponding print head in the y-direction, and each orientation device and the second shaft assigned to it are cooperatively configured such that a rotation of the second shaft is converted into a rotation of the corresponding print head around an axis of rotation which is substantially parallel to an instantaneous $z_M$-direction of the printing medium 103 associated with the print head.

Accordingly, according to a preferred embodiment, a first mechanical auxiliary means for orientating and a second mechanical auxiliary means for positioning are assigned at least to each of the first and second print heads 101, 105" in such a way that the desired operative connection can be transmitted via the first and/or second mechanical auxiliary means, wherein the first and second mechanical auxiliary means preferably are elongated shafts.

Figure 1C:
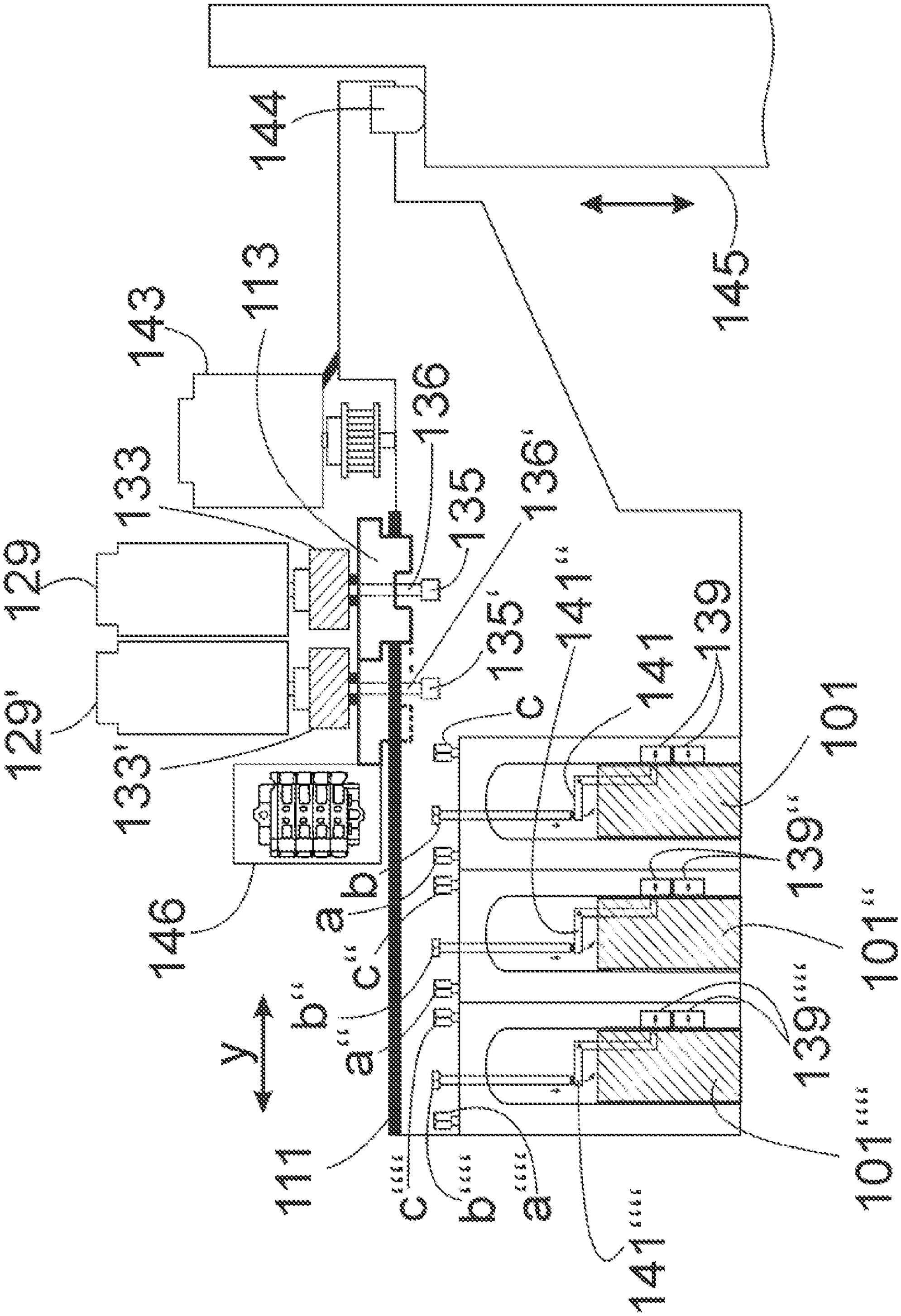
FIG. 1*c* shows a schematic side view of the auxiliary device of the printing system according to the invention from FIG. 1*a* and FIG. 1*b* in cross section.

FIG. 1*b* shows that the print bar 119 from FIG. 1*a* carries a T-shaped linear guide 111 which extends over the print bar 119 in the y-direction, as shown in FIG. 1*c*. The auxiliary device 107 comprises a carriage 113 and a handle 114 via which the carriage 113 is coupled to the linear guide 111 and via which handle 114 the carriage 113 is moveably arranged along the T-shaped linear guide 111. The print bar 119 comprises a displacing actuator 143 (see FIG. 1*c*), which is configured to be able to move the carriage 113 back and forth along the linear guide 111 in the y-direction.

The auxiliary device 107 comprises the first adjustment actuator 105 and the second adjustment actuator 105'. As shown in detail in FIG. 1*b*, the first adjustment actuator 105 comprises a first stepper motor 129 with a first motor shaft 131 and a first coupling actuator 133 for extending and retracting a first actuator shaft 136 with an internal hexagon 135, wherein the first motor shaft 131 and the first coupling actuator 133 are connected to each other via a first driving belt 137 for rotating the first actuator shaft 136. The second adjustment actuator 105' comprises a second stepper motor 129' with a second motor shaft 131' and a second coupling actuator 133' for extending and retracting a second actuator shaft 136' with an internal hexagon 135', wherein the second motor shaft 131' and the second coupling actuator 133' are connected to each other via a second driving belt 137' for rotating the actuator shaft 136'.

According to the invention, the auxiliary device 107 and optical means 109 are provided in the printing system 100 in such a way that automated adjustment of the five print heads 101, 101', 101", 101'", 101"" is enabled with said optical means using predetermined printed test patterns (not shown). This is done in several steps by successively adjusting the print heads to be adjusted with respect to the printing medium 103 by orienting and positioning them by means of the first adjustment actuator 105 and by means of the second adjustment actuator 105'. The optical means 109 make it possible to record optically the printed test patterns with the camera 110 of the optical means 109. In this respect the optical means 109 is configured to cooperate with the auxiliary device 107.

For this purpose, the printing medium 103 is printed in a first step by ink being ejected in the form of drops via the five print heads 101, 101', 101", 101'", 101"", while the printing medium 103 is moved accordingly via the cylindrical roll shell 117 (see FIG. 1*a* and FIG. 1*b*) in a circular movement and the rows of nozzles of the print heads 101, 101', 101", 101'", 101"" each print a predetermined test pattern on the printing medium 103 (not shown).

In a second step, the $x_M$-y alignment and the y-position of the rows of nozzles of the respective print heads 101, 101', 101", 101'", 101"" are determined on the basis of the respective x-y alignment of their test patterns printed on the printing medium and by means of the optical means 109; in a third step an actual/target comparison is carried out in order to identify the print heads to be adjusted.

The target position of a predetermined test pattern is stored in an evaluation unit so that an actual/target comparison can be carried out. In addition, the target alignment of a predetermined test pattern can be stored in the evaluation unit so that a corresponding actual/target comparison can be carried out. Alternatively, after step two has been carried out, an actual alignment of one of the five printed test patterns can be selected as a target value, either manually by a user or automatically by the evaluation unit on the basis of predetermined criteria, and used as the target alignment for the orientation of the other print heads.

If, for example, the x-y alignment of a test pattern formed on the printing medium 103 with a print head 101, 101', 101", 101'", 101"" is incorrect, the corresponding $x_M$-y alignment of the print head in question can be corrected by means of the corresponding adjustment actuator 105, 105'.

In the present method and case, in an intermediate step after step two and before step three, the $x_{M1}$-y alignment (see FIG. 1*b*) of the print head 101 was defined as the target alignment by the evaluation unit, and in step three, a deviation from their target orientation and target position was detected in the print heads 101', 101", 101'" and 101'" (see FIG. 1*a*). The $x_{M1}$-alignment of the print head 101 has an alignment angle of 90 degrees with respect to its associated $x_{M1}$-direction.

In a fourth step, based on the situation shown in FIG. 1*a* and FIG. 1*b*, the deviation of the $x_{M2}$-y alignment and the y-position of the print head 101' to be adjusted from the target values is first minimized with the aid of the second adjustment actuator 105'. The $x_{M2}$-y alignment of the print head 101' is correct when its row of nozzles has an $x_{M2}$-y alignment of 90 degrees with respect to its associated $x_{M2}$ direction, which corresponds to the actual alignment of the row of nozzles of the print head 101.

For the corresponding adjustment, the auxiliary device 107 is provided in the printing system 100 in such a way that with the aid thereof an operative connection of the second adjustment actuator 105' with the print head 101' is created with and via the first shaft a' and after the adjustment has been made by orientation, it is released again and an operative connection with the print head 101' is then created with and via the second shaft c' and released again, after the adjustment has been made by positioning.

The operative connection between the second adjustment actuator 105' and the first shaft a' is created by first moving the auxiliary device 107 via the linear guide 111 to a specific position and stopping it there. The second actuator shaft 136' of the second coupling actuator 133' is then extended until its internal hexagon 135' is operatively connected to the external hexagon of the shaft a'. After the adjustment has been made by orienting the print head 101', the operative connection between the second adjustment actuator 105' and the first shaft a'—and thus between the second adjustment actuator 105' and the print head 101'—is released again by the coupling actuator 133' retracting the second actuator shaft 136'. According to the procedure described in the previous sentence an operative connection between the first adjustment actuator 105 and a first shaft a, a", a"" and/or a shaft c, c", c"" is created and released again by means of the first coupling actuator 133.

In a fifth step, with the aid of the auxiliary device 107, an operative connection of the first adjustment actuator 105 with the print head 101" is created with and via the shaft a" and released again, after the adjustment has been carried out by orientation, and an operative connection with the print head 101" is created with and via the shaft c" and released again, after the adjustment has been made by positioning.

In a sixth step, with the aid of the auxiliary device 107, an operative connection of the second adjustment actuator 105' with the print head 101" is created with and via the shaft a'" and released again, after the adjustment has been carried out by orientation, and an operative connection with the print head 101'" is created with and via the shaft c'" and released again, after the adjustment has been made by positioning.

In a seventh step, with the aid of the auxiliary device 107, an operative connection of the first adjustment actuator 105 with the print head 101"" is created with and via the shaft a"" and released again, after the adjustment has been carried out by orientation, and an operative connection with the print head 101"" is created with and via the shaft c"" and released again, after the adjustment has been made by positioning.

After completion of the first adjustment process, at least one further checking process corresponding to steps one and two described above and, if necessary, at least one further adjusting process is/are carried out until all print heads 101', 101", 101'", 101"" are correctly adjusted with respect to the printing medium 103 and an adjacent print head.

A preferred embodiment of the printing system 100 according to the invention has been disclosed, which comprises at least one adjustment actuator less than the number of print heads provided in the printing system 100, wherein an auxiliary device 107 is provided in the printing system 100, such that with the aid thereof an operative connection of the at least one adjustment actuator 105 with the first print head 101 can be released and/or created in an actuator-based and automated manner, and an operative connection with the second print head 101" can be created and/or released, preferably also in an actuator-based manner and particularly preferably automatically, wherein optical means 109 are provided in the printing system 100 such that automated adjustment of the print heads 101, 101" is enabled with said optical means 109 using predetermined printed test patterns, said optical means 109 being configured to cooperate with the auxiliary device 107.

FIG. 1*c* shows a schematic side view of the auxiliary device 107 of the printing system 100 according to the invention from FIGS. 1*a* and 1*b* in cross section.

The print bar 119 shown in FIG. 1*c* can be displaced using adjusting means 145 between a working position and a repair position relative to the cylindrical roll shell 117, wherein the print bar 119 comprises, in the region of one of its side flanks, on its front side, a respective assembly for mounting the print heads 101, 101', 101"", wherein each assembly comprises fixing means for fixing the respective print heads 101, 101", 101"" in a non-positive manner. Each of the fixing means comprises two jaws 139, 139", 139"" which are arranged on a side wall of the respective assembly and apply a predetermined force against the respective print head 101, 101", 101"" inserted in the assembly. For example, the fixing means are arranged and configured in the assemblies receiving the print head 101 in such a way that they allow frontal insertion of the print head 101 against the direction of gravity in a repair position of the print bar 119, relative to the cylindrical roll shell 117 and that a print head 101 attached to the fixing means is fixed in a non-positive manner so that it cannot be released from a mounting position solely by the force of gravity acting downwards on it, but can only be released from the fixing means by an external force. As shown in FIG. 1*c*, the auxiliary device 207 comprises an electrical connection 146 via which the auxiliary device 107 can be supplied with electrical current.

According to a preferred embodiment of the printing system 100, the print bar 119 can be displaced using adjusting means 145 between a working position and a repair position relative to a receiving surface, wherein the print bar 119 comprises on its front side a respective assembly including fixing means for the non-positively fixing of the first and second print heads 101, 101" to mount the at least first and second print heads 101, 101", wherein the fixing means are arranged and configured in the assemblies in such a way that they allow frontal insertion of each of the first and second print heads 101, 101" against the direction of gravity in a repair position of the print bar 119 relative to the receiving surface, and that the first and second print heads 101, 101" fixed to the respective fixing means are fixed in a non-positive manner so that they cannot be released from a mounting position solely by the force of gravity acting downwards on them, but can only be released from the respective fixing means by an external force.

Such fixing means for fixing can advantageously be used, if a print head has to be mounted in a position in the print bar that is difficult to reach, since one-handed work is possible without any problems.

The assemblies for mounting the print heads 101, 101', 101"" shown in FIG. 1*c* each include, in addition to the above-mentioned two jaws 139, 139", 139"" of the fixing means, a lever arm 141, 141", 141"" and third shafts b, b", b"", wherein the lever arm 141, 141", 141"" is retained rotatably in the respective assembly with respect to the jaws 139, 139", 139"" and the third shaft b, b", b"" assigned to it (see also FIG. 1*a*), wherein the respective lever arm 141, 141", 141"" is arranged such that it can be displaced between a fixing position and a release position and interacts with the jaws 139, 139", 139"" and the third shaft b, b', b"" assigned to it such that the print head 101, 101', 101"" which is fixed in the fixing position to the respective fixing means is fixed in a non-positive manner so that it cannot be released from a mounting position solely by the force of gravity acting downwards on it, but can only be released from the respective fixing means by an external force and that in the release position the respective print head 101, 101', 101"" cannot be released from a mounting position solely by the force of gravity acting downwards on it but can be released from the respective fixing means using an external force lower than that in the fixing position.

Accordingly, in a particularly preferred embodiment of the printing system 100, the respective assembly for mounting the first and second print heads 101, 101" comprises fixing means with at least one jaw 139, 139" and one third shaft b, b" assigned to the first and second print heads 101, 101" and a lever arm 141, 141" which is rotatably hold with respect to the respective jaw 139, 139" and the third shaft b, b", wherein the respective lever arm 141, 141" is arranged in the corresponding assembly in such a way that it can be displaced between a fixing position and a release position and interacts with the respective third shaft b, b" and with the respective jaw 139, 139" in such a way that the print head 101, 101" which is fixed in the fixing position to the respective fixing means is fixed in a non-positive manner such that it cannot be released from the mounting position solely by the force of gravity acting downward on it, but can only be released from the respective fixing means by an external force and that in the release position the respective print head 101, 101" cannot be released from a mounting position solely by the force of gravity acting downwards on it but can be released from the respective fixing means using an external force lower than that in the fixing position This further development also has the advantage that, if a print head has to be mounted in a position in the print bar that is difficult to reach, it can be worked on with one hand without any problems.

The print bar 119 of the printing system 100 comprises two rows of print heads which are arranged on its opposite side flanks, wherein the auxiliary device 107 is mounted on and above the print bar 119, wherein the printing system 100 has a supply device above the auxiliary device 107 for supplying the respective print heads 101, 101', 101", 101'", 101"" with ink and electric current (not shown), and wherein the corresponding supply of the print heads 101, 101', 101", 101'", 101"" is effected by at least one fluid communication and one electrical communication which are arranged outside the print bar 119 along one or both lateral flanks.

Accordingly, according to a particularly preferred embodiment of the printing system 100, the print bar 119 can comprise two rows of print heads, which are arranged on its opposite side flanks, wherein the auxiliary device 107 is mounted on and above the print bar 119, wherein the printing system 100 has a supply device above the auxiliary device 107 for supplying at least the first and second print heads 101, 101" with ink and electric current (not shown), and wherein the corresponding supply of the print heads 101, 101" is effected by at least one fluid communication and one electrical communication which are arranged outside of the print bar 119 along one or both lateral flanks.

This further development makes it possible to create a space on and above the print bar in order to place the auxiliary device therein and thus to realize a compact print bar with a supply device.

Figure 2A:
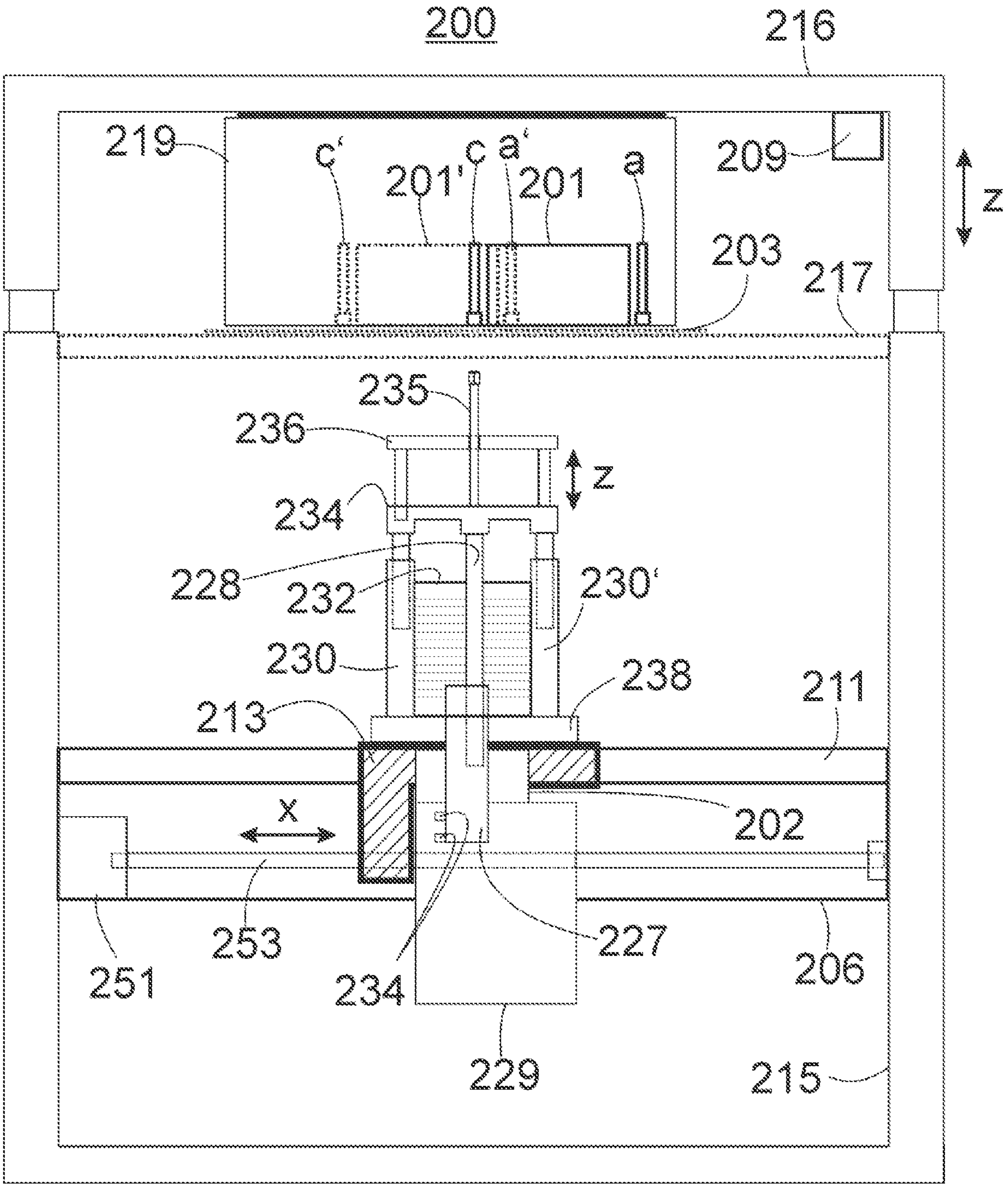
FIG. 2*a* shows a schematic side view of a preferred embodiment of a second variant of the printing system according to the invention with an auxiliary device in a parking position.

FIG. 2*a* shows a particularly preferred embodiment of the second variant of the printing system 200 according to the invention in a parking position.

The printing system 200 can be divided into an upper and a lower region, wherein the lower region comprises a carrier 215 onto which a receptacle is mounted having a flat receiving surface 217 for receiving a printing medium 203 (shown as dashed line), wherein the flat receiving surface 217 constitutes the boundary between the upper and lower region of the printing system 200. The upper region comprises at least one modular color unit arranged above the receiving surface 217 and mounted on adjusting means 216, which are configured to be able to adjust the distance between the modular color unit and the flat receiving surface 217 or the printing medium 203, wherein the modular color unit has at least one print bar 219 with the first and second print heads 201, 201'. The modular color unit is mounted on the adjusting means 216 (not shown) via a linear guide system for displacing the print bar 219 back and forth in a y-direction which is transverse to the x-direction. The printing system 200 also comprises an auxiliary device 207 with a first adjustment actuator 205 which is arranged in the lower region of the printing system 200 and mounted on the carrier 215. The y-axis would be shifted out of the image plane, i.e. the linear guide system can be used to move the print bar 219 in and out of the image plane in the y-direction, while the print bar 219 prints the printing medium 203 with print material 203. As shown in FIG. 2*a* (as dashed lines), the second print head 201' is arranged offset in the y-direction behind the first print head 201 in the x-direction in order to double the print width, if the adjustment is correct. In the printing system 200, the modular color unit is a single print bar 219.

The print bar 219 is opposite the flat receiving surface 217 and spaced apart from it. The printing medium 203 picked up can be moved along a straight transport path in an x-direction by means of driving means via the flat receiving surface 217, while the printing medium 203 is not printed by the first and second print heads 201, 201'. A first and a second device for adjusting a print head (not shown) are assigned to each of the two print heads 201, 201'. Via these devices the respective print heads 201, 201' can be adjusted with respect to the printing medium 203 by positioning and orienting using the first adjustment actuator 205.

The first device for adjusting a print head which is assigned to each of the print heads 201, 201' comprises an orientation device (not shown) and a first shaft a, a'. The second device for adjusting a print head which is assigned to each of the print heads 201, 201' comprises a displacement device (not shown) and a second shaft c, c'.

The first shaft a is operatively connected to that orientation device via which the print head 201 is arranged in the print bar 219 and the second shaft c is operatively connected to that displacement device via which the print head 201 is arranged in the print bar 219. The first shaft a', however, is operatively connected to that orientation device via which the print head 201' is arranged in the print bar 219 and the second shaft c' is operatively connected to that displacement device via which the print head 201' is arranged in the print bar 219. The first shafts a, a' and second shafts c, c' are mechanical auxiliary means. Each displacement device is configured to cooperate with the first shaft assigned to it in such a way that a rotation of the first shaft is converted into a displacement of the print head in the x-direction. The orientation device is configured to cooperate with the second shaft assigned to it in such a way that a rotation of the second shaft is converted into a rotation of the second print head around an axis of rotation which is essentially aligned in parallel to the z-direction. The z-direction is the direction that is orthogonal to the x direction and y direction.

Accordingly, according to a preferred embodiment, a first mechanical auxiliary means for orientation and a second mechanical auxiliary means for positioning are assigned at least to each of the first and second print heads 201, 205" in such a way that the desired operative connection can be transmitted via the first and/or second mechanical auxiliary means, wherein the first and second mechanical auxiliary means preferably are elongated shafts.

The second print head 201' shown in FIG. 2*a* is arranged, for example, in the print bar 219 via the orientation device assigned to it in such a way that it can be adjusted with respect to the printing medium 203 by orienting using the first adjustment actuator 205. This is done by the orientation device allowing a rotation of the second print head 201' about an axis of rotation which is substantially aligned in parallel to the z-direction. Furthermore, the second print head 201' is arranged in the print bar 219 via the displacement device assigned to it in such a way that it can be adjusted with respect to the printing medium 203 by positioning using the first adjustment actuator 205. This is done by the displacement device allowing a displacement of the print head 101' that is limited to the y-direction and relative to the adjacent first print head 201. The first and second devices for adjusting a print head which are assigned to each of the print heads are configured to cooperate with one another.

The auxiliary device 207 comprises a linear guide system 206 with a linear guide 211 and a carriage 213 as well as the first adjustment actuator 205 (see FIG. 2*c*) with a base plate 238, via which base plate 238 the first adjustment actuator 205 is mounted on the carriage 213 and arranged along the linear guide 211 in the x-direction so that it can be moved back and forth.

The linear guide system 206 comprises a displacement actuator having a ball screw 253 and a servomotor 251 for driving the ball screw 253, which ball screw 253 is operatively connected to the carriage 213 for moving the adjustment actuator 205 in the x-direction.

The first adjustment actuator 205 comprises a servo motor 229 with a motor shaft which is connected via a planetary gear 202 to a gear shaft using a bellows coupling 232. The bellows coupling 232 comprises a bellows and two hubs at its two ends, the first hub being non-positively connected to the end of the gear shaft and the second hub which is designed as a hexagonal hub, is non-positively connected to one end of a hexagonal shaft, but is arranged so as to be displaceable in the z-direction. The other end of the hexagonal shaft is coaxially connected to an actuator shaft 235, the actuator shaft 235 comprising an external hexagonal head for operatively connecting it by means of a coupling actuator, with and via a first or second shaft a, a', c, c' having an internal hexagonal head, to the first or second device for adjusting the first or second print head 201, 201'.

The coupling actuator comprises a compressed air cylinder 227 with a compressed air cylinder piston that can be extended and retracted in the z-direction, and two disengaging cylinders, each with a disengaging piston 230, 230', the compressed air cylinder piston 228 and the two disengaging pistons 230, 230' are connected to one another via a triangular clutch release plate 234 in such a way that they can be extended and retracted together when positive or negative pressure is applied to the compressed air cylinder piston 228. The two disengaging pistons 230, 230' each have a guide piston with a smaller diameter inside, which are connected to one another at their ends facing away from the disengaging piston 230, 230' via a guide plate, wherein the disengaging pistons 230, 230' can be guided along the guide piston to the guide plate when they are extended.

The center of the clutch release plate 234 comprises a ball bearing in which the hexagonal shaft is rotatably mounted and via which the hexagonal shaft is firmly connected to the release plate 234, so that it can be extended and retracted together with the clutch release plate 234 in the z-direction. The guide plate 236 has a through opening in its center through which the actuator shaft 235 protrudes and is movably guided.

Figure 2B:
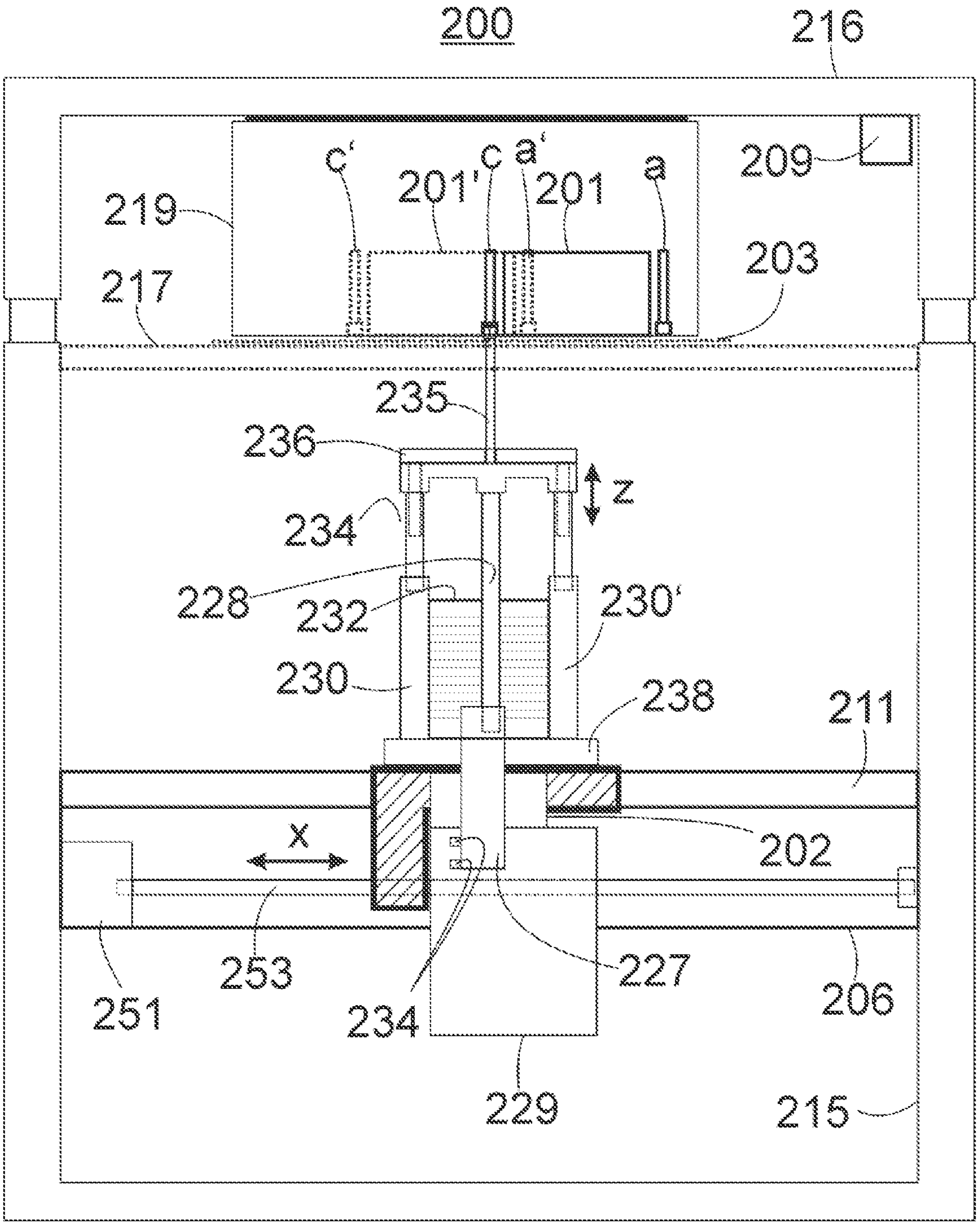
FIG. 2*b* shows the preferred embodiment of the printing system from FIG. 2*a* with the auxiliary device in a working position.
Figure 2C:
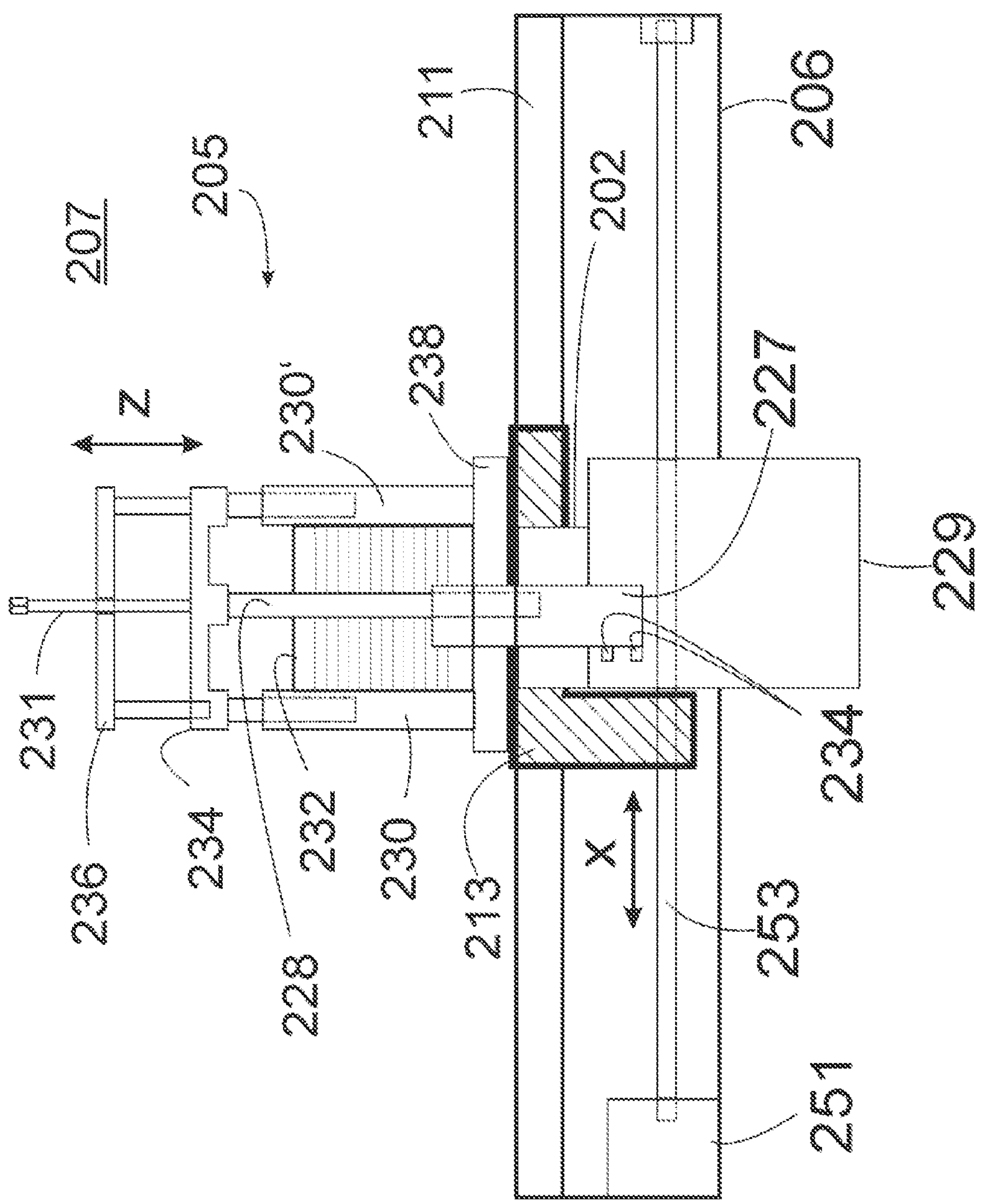
FIG. 2*c* shows the auxiliary device from FIG. 1*a* on an enlarged scale.

FIG. 2*b* shows the particularly preferred embodiment of the second variant of the printing system 200 according to the invention from FIG. 2*a* in a working position in which the actuator shaft 228 having an external hexagon is operatively connected to the internal hexagon of the second shaft c of the print head 201 after the compressed air cylinder piston 228 had been extended.

As in the printing system 100 from FIG. 1*a*, optical means 209 are provided in the printing system 200 in such a way that automated adjustment of at least the first and second print heads 201, 201' is enabled with said optical means 209, preferably using predetermined printed test patterns, said optical means 209 being configured to cooperate with the auxiliary device 207.

For this purpose, the printing medium 203 is printed in a first step of the method by ink being ejected in the form of drops via the two print heads 201, 201', while the print bar 219 is moved back and forth, once or several times, over the printing medium 203 via the linear guide system in the y-direction and does not move the printing medium 203, the rows of nozzles of the print heads 201, 201' each printing a predetermined test pattern on the printing medium 203 (not shown).

In a second step, the x-y alignment and the y-position of the rows of nozzles of the respective print heads 201, 201' are determined, on the basis of the x-y alignment of their printed test patterns, by means of the optical means 209 of the printing system 200. In a third step an actual/target comparison is made to identify print heads to be adjusted.

The target positioning of a predetermined test pattern is stored in an evaluation unit so that an actual/target comparison can be carried out. In addition, the target alignment of a predetermined test pattern can be stored in the evaluation unit so that a corresponding actual/target comparison can be carried out. Alternatively, after step two has been carried out, an actual alignment of one of the five printed test patterns can be selected as a target value either manually by a user or automatically by the evaluation unit on the basis of predetermined criteria and used as the target alignment for the orientation of the other print heads.

If, for example, the x-y alignment of a test pattern formed on the printing medium 103 by a print head 201, 201' is not correct, the x-y alignment of the respective print head can be corrected using the first adjustment actuator 205.

In the present method and case, in an intermediate step after step two and before step three, the x-y alignment of the second print head 201' was defined as the target alignment by the evaluation unit, and in step three a deviation from the target orientation and target position of the first print head 201 was determined.

In a fourth step, the deviation of the x-y alignment and the y position of the first print head 201 to be adjusted from the target values is minimized by means of the first adjustment actuator 205.

For the corresponding adjustment, the auxiliary device 207 is provided in the printing system 200 in such a way that with the aid thereof an operative connection of the first adjustment actuator 205 with the first print head 201 is created with and via the first shaft a and after the adjustment has been made by orientation, it is released again and then an operative connection with the first print head 201 is created with and via the second shaft c and released again, after the adjustment has been made by positioning.

The operative connection between the adjustment actuator 205 and the first shaft a is created by first moving the print head 201 via the linear guide system to a repair area outside the receiving surface 217 for displacing the print bar 219 back and forth and by stopping it in the repair area at a predetermined repair position. The auxiliary device 207 is then moved to a predetermined position by means of the linear guide system 206 and is stopped there. The compressed air cylinder piston 228 is then pressurized via the valves 234 arranged in the compressed air cylinder 227 in such a way that the compressed air cylinder piston 228 is extended, while the actuator shaft 235 is slowly rotated by means of the servomotor 229 until the external hexagon of the actuator shaft 235 is operatively connected to the internal hexagon of the shaft a. In this working position, the clutch release plate 234 has come into contact with the guide plate 236 and has stopped. The extendable path length of the compressed air cylinder piston 228 can be defined in advance using means provided for this purpose and can preferably be monitored automatically. The operative connection between the adjustment actuator 205 and the first shaft a—and thus between the adjustment actuator 205 and the first print head 201—is released again after the adjustment has been made by orienting the print head 201. This is done by the coupling actuator retracting the actuator shaft 235 again. Accordingly, an operative connection between the adjustment actuator 205 and the second shaft c of the print head 201 is created by means of the auxiliary device 207 and released again using the procedure described above.

After completion of the first adjustment process, at least one further checking process corresponding to steps one and two described above and, if necessary, at least one further adjusting process is/are carried out in order to ensure that the print head 201 is correctly adjusted with respect to the printing medium 203 and the second print head 201'.

A preferred embodiment of the printing system 200 according to the invention has been disclosed, comprising at least one adjustment actuator 205 less than the number of print heads 201, 201' provided in the printing system 200, wherein an auxiliary device 207 is provided in the printing system 200 such that with the aid thereof an operative connection of the at least one adjustment actuator 205 to the first print head 201 can be released and/or created in a pneumatic and actuator-based manner and automatically and an operative connection to the second print head 201' can be created and/or released, wherein optical means 209 are provided in the printing system 200 such that automated adjustment of the print heads 201, 201' is made possible with said optical means 209 via predetermined printed test patterns, said optical means 209 being configured to cooperate with the auxiliary device 207.

The print bar 219 shown in FIG. 2*a* can be displaced, with respect to the flat receiving surface 217, via the linear guide system (not shown) which moves the print bar 219 back and forth in a y-direction running transversely to the x-direction between a working position and a predetermined repair position, which, as described above, is located in the repair area of the printing system 200. The print bar 219 comprises on its front side a respective assembly for mounting the print heads 201, 201", wherein each assembly comprises fixing means for fixing the respective print heads 201, 201" in a non-positive manner. Each of the fixing means comprises two jaws (not shown here) which are arranged on a side wall of the respective assembly and apply a predetermined force against the respective print head 201, 201" inserted into the assembly. For example, the fixing means are arranged and configured in the assemblies receiving the print head 201 in such a way that they allow frontal insertion of the print head 201 against the direction of gravity in a repair position of the print bar 219, relative to the flat receiving surface 217, and that a print head 201 attached to the fixing means is fixed in a non-positive manner so that it cannot be released from a mounting position solely by the force of gravity acting downwards on it, but can only be released from the fixing means by an external force.

According to a preferred embodiment of the printing system 200, the print bar 219 can be displaced, with respect to a receiving surface, via a linear guide system which is attached to the adjusting means 216 and moves the print bar 219 back and forth in a y-direction running transversely to the x-direction between a working position and a repair position. The print bar 219 comprises on its front side a respective assembly including fixing means for the non-positive fixing of the first and second print heads 201, 201" to mount the at least first and second print heads 201, 201", wherein the fixing means are arranged and configured in the assemblies in such a way that they allow frontal insertion of each of the first and second print head 201, 201" against the direction of gravity in a repair position of the print bar 219, relative to the receiving surface and that the first and second print heads 201, 201" attached to the respective fixing means are fixed in a non-positive manner so that they cannot be released from a mounting position solely by the force of gravity acting downwards on them, but can only be released from the fixing means by an external force.

In the lower region of the printing system 200, a changing device is indirectly mounted below the receiving surface 203 on the carrier 215 in such a way that it can be used to remove a print head from the assembly and/or insert it into the assembly, preferably in an actuator-based manner and particularly preferably automatically.

Accordingly, according to a particularly preferred embodiment, a changing device is provided in the lower region of printing system 200. Said changing device is preferably mounted directly or indirectly below the receiving surface 203 on the carrier 215 in such a way that it can be used to remove a print head from the assembly and/or insert it into the assembly, preferably in an actuator-based manner and particularly preferably automatically. If the changing device is designed in such a way that it can be used to remove a print head from the assembly and/or insert it into the assembly in an actuator-based and automatic manner, then the changing device is configured to cooperate with the linear guide system which is attached to the adjusting means 216 and moves the print bar 219 back and forth in a y-direction transverse to the x-direction.

This further development is advantageous because it means that the maintenance effort for replacing defective print heads can be reduced and can be carried out by a layman without technical knowledge.

REFERENCE NUMBERS

100, 200 print head
101, 101', 101", 101'", 101"", 201, 201' printing system

103, 203 printing medium
105, 105', 205 adjustment actuator
107, 207 auxiliary device
109 optical means
110 camera
111, 211 linear guide
113, 213 carriage
114 handle
115, 215 carrier
216 print bar carrier
117 roll shell
119, 219 print bar
121, 121 winding core
123, 123' deflection roller
129, 129' stepper motor
131, 131', 231 motor shaft
133, 133' coupling actuator
135, 135, 235 actuator shaft
137, 137' driving belt
139, 139", 139"" jaw
141 lever arm
143, 243 displacement actuator
144 bracket
145, 245 adjusting means
146 electrical connection
217 flat receiving surface
227 compressed air cylinder
228 piston
229 servomotor
230, 230' guidance
232 bellows coupling
234 clutch release plate
236 guide plate
238 base plate
251 servomotor
253 ball screw

The invention claimed is:

1. A printing system comprising at least a first and a second print head, wherein the printing system is configured such that the first and second print heads are adjusted actuator-based with respect to a printing medium by positioning and orienting using adjustment actuator, wherein the printing system comprises at least one adjustment actuator less than the number of print heads provided in the printing system, and an auxiliary device is provided in the printing system such that with aid thereof an operative connection of the at least one adjustment actuator with the first print head is released and/or engaged, and an operative connection with the second print head is engaged and/or released, wherein the printing system can be divided into an upper and a lower region, the lower region comprising a carrier onto which a receptacle is mounted having a receiving surface for receiving the printing medium, the upper region comprising at least one modular color unit arranged above the receiving surface and mounted on adjusting means which are adapted to be able to adjust the distance between the modular color unit and the receiving surface or the printing medium, wherein the modular color unit comprises at least one print bar including the first and second print heads and wherein the receiving surface forms the boundary between the upper and lower region and wherein the auxiliary device is arranged in the lower region.

2. The printing system according to claim 1, wherein optical means are provided, such that automated adjustment of the print heads is enabled with said optical means configured to cooperate with the auxiliary device.

3. The printing system according to claim 1, wherein the auxiliary device comprises at least one linear guide and a carriage, wherein the carriage is displaceably arranged on the linear guide and the at least one adjustment actuator is mounted on the carriage.

4. The printing system according to claim 1, wherein the auxiliary device comprises less than five adjustment actuators.

5. The printing system according to claim 1, wherein the at least first and the at least second print head are each assigned to a first mechanical aid for orientation and a second mechanical aid for positioning, such that the desired operative connection is achieved via the first and/or second mechanical aid, the first and second mechanical aid.

6. The printing system according to claim 1, wherein the printing system is divided into an upper and a lower region, the lower region comprising a carrier onto which a receptacle is mounted having a receiving surface for receiving the printing medium, the upper region comprising at least one modular color unit arranged above the receiving surface and mounted on adjusting means which are adapted to be able to adjust the distance between the modular color unit and the receiving surface or printing medium, wherein the modular color unit comprises at least one print bar including the first and second print heads and wherein the receiving surface forms the boundary between the upper and lower region, wherein the auxiliary device is arranged in the upper region.

7. The printing system according to claim 6, wherein the printing system comprises a plurality of print bars and a plurality of auxiliary devices, wherein an auxiliary device (107) is mounted on a respective print bar.

8. The printing system according to claim 6, wherein the print bar comprises two rows of print heads arranged on opposite lateral flanks thereof, the auxiliary device being mounted on and above the print bar, wherein the printing system comprises a supply device for supplying the print heads above the auxiliary device with ink and electric current, and wherein the respective supply of the print heads is effected by at least one fluid communication and one electrical communication arranged outside the print bar along a lateral flank.

9. The printing system according to claim 1, wherein the first adjustment actuator comprises a servomotor including a motor shaft which is connected via a planetary gear to a gear shaft using a bellows coupling.

10. The printing system according to claim 1, wherein the print bar is adjustable using adjusting means or a linear guide system attached to adjusting means for displacing the print bar back and forth in a y-direction perpendicular to the x-direction between a working position and a repair position in relation to a receiving surface, wherein the print bar on the front side thereof comprises a respective assembly including fixing means for the non-positively fixing of the first and second print heads to mount the at least first and second print heads, wherein the fixing means in the assemblies are arranged and formed such that they allow frontal insertion of each of the first and second print head against the direction of gravity in a repair position of the print bar relative to the receiving surface and that the first and second print heads fixed to the respective fixing means are force-locked so that they cannot be released from a mounting position solely by the gravitational force acting downwards along them, but can only become detached from the respective fixing means by an external force.

11. The printing system according to claim 10, wherein the respective assembly for mounting the first and second print heads comprises fixing means having at least one jaw and a third shaft assigned to the first and second print heads and a lever arm which is rotatably supported with respect to the respective jaw and the third shaft, wherein the respective lever arm is arranged in the respective assembly so as to be displaceable between a fixing position and a release position, and interacting with respective third shaft and the respective jaw such that the print head, which is fixed in the fixing position to the respective fixing means, is non-positively fixed so that it cannot be released from the mounting position solely by the gravitational force acting downwards along it, but can only be released from the respective fixing agent by an external force and that in the release position the respective print head cannot be released from a mounting position solely by the gravitational force but is released from the respective fixing agent using an external force lower than that in the fixing position.

12. The printing system according to claim 1, further comprising a changing device is provided in the lower region of the printing system.

* * * * *